United States Patent
Tsai

Patent Number: 5,992,407
Date of Patent: Nov. 30, 1999

[54] MINIATURE GAS STOVE SUPPORT

[76] Inventor: Tien-Shen Tsai, No.15, Lane 171, SSU Wei Rd., Wu Ku Country, Taipei Hsien, Taiwan

[21] Appl. No.: 09/264,683

[22] Filed: Mar. 9, 1999

[51] Int. Cl.⁶ .................................................... F24C 3/08
[52] U.S. Cl. ............................. 126/40; 126/38; 126/50; 248/163.1; 248/157
[58] Field of Search .................................. 126/41 R, 30, 126/9 R, 9 B, 38, 40, 43, 50, 52; 248/163.1, 157

[56] References Cited

U.S. PATENT DOCUMENTS

| | | | |
|---|---|---|---|
| 2,638,085 | 5/1953 | Guedon | 126/40 |
| 4,726,350 | 2/1988 | Steinhauser | 126/38 |
| 4,809,671 | 3/1989 | Vallejo, Jr. | 126/39 R |
| 5,038,749 | 8/1991 | Jerry et al. | 126/40 |
| 5,065,735 | 11/1991 | Bourgeois et al. | 126/40 |

*Primary Examiner*—Larry Jones
*Attorney, Agent, or Firm*—Rosenberg, Klein & Lee

[57] ABSTRACT

A miniature gas stove support mainly including lower seat and upper locating ring distantly connected to one another by vertical bars, three equally spaced outward inclined legs connected to a bottom of the seat, and multiple petal-shaped wind shielding members connected to and along a top of the locating ring. Bolts are threaded downward to screw the locating ring and the vertical bars together while head portions of the bolts project from the locating ring to adjustably support a cooking utensil above a burner of the miniature gas stove. The petal-shaped wind shielding members fixed along the locating ring effectively shield the burner from wind to avoid undesired extinguishment of fire.

2 Claims, 4 Drawing Sheets

5,992,407

MINIATURE GAS STOVE SUPPORT

BACKGROUND OF THE INVENTION

The present invention relates to a miniature gas stove support, and more particularly to gas stove support that not only stably supports a miniature gas stove but also effectively shields the same from wind.

A miniature gas stove is frequently used in outdoor activities, such as mountaineering and camping, but is preferably fixed in place and shielded from wind. FIG. 1 illustrates an ordinary miniature gas stove 1 that is fixed in place by disposing it within a supporting frame 13 and is shielded from wind by positioning a foldable wind shielding screen 14 to one side of the miniature gas stove 1. When the supporting frame 13 is not available, a user would possibly fix the miniature gas stove 1 in place only by fuel tanks connected to a bottom of the miniature gas stove 1. The miniature gas stove 1 usually has a structure that would result in a distance between a burner of the miniature gas stove 1 and a cooking utensil (not shown) positioned on the miniature gas stove 1 above the burner. The distance between the burner and the cooking utensil would adversely reduce a heating efficiency of the miniature gas stove 1. Moreover, the supporting frame 13 and the wind shielding screen 14 are not conveniently portable and can not be easily erected to stand stably when they are positioned on an uneven ground. Therefore, such conventional supporting frame 13 and wind shielding screen 14 have only limited function in respect of supporting and shielding the miniature gas stove 1.

SUMMARY OF THE INVENTION

It is therefore a primary object of the present invention to provide an improved miniature gas stove support that includes lower seat and upper locating ring connected to one another by vertical bars, three equally spaced outward inclined legs connected to a bottom of the seat, and multiple petal-shaped wind shielding members connected to a top of the locating ring. A miniature gas stove may be position in the support via the locating ring to flatly locate on the seat. Bolts are threaded downward to screw the locating ring and the vertical bars together with head portions of the bolts projected from the locating ring. A cooking utensil positioned above a burner of the miniature gas stove is supported on the head portions of the bolts. And, the petal-shaped wind shielding members fixed around the locating ring may effectively shield the burner from wind to avoid undesired extinguishment of fire.

Another object of the present invention is to provide the above miniature gas stove in which the bolts may be turned to adjust a distance between the cooking utensil and the burner and to allow stable position of the cooking utensil on them, and the petal-shaped wind shielding members have curved surfaces that reflect heat radiated on them to enhance heating efficiency of the miniature gas stove. A further object of the present invention is to provide the above miniature gas stove support of which all parts, including the petal-shaped wind shielding members, are detachably connected to one another, so that the miniature gas stove support can be easily disassembled for storage or carrying about.

BRIEF DESCRIPTION OF THE DRAWINGS

The novelty and main features of the present invention can be best understood by referring to the following detailed description of the preferred embodiment and the accompanying drawings wherein.

DETAILED DESCRIPTION OF THE PREFERRED EMBODIMENTS

Figure 1:
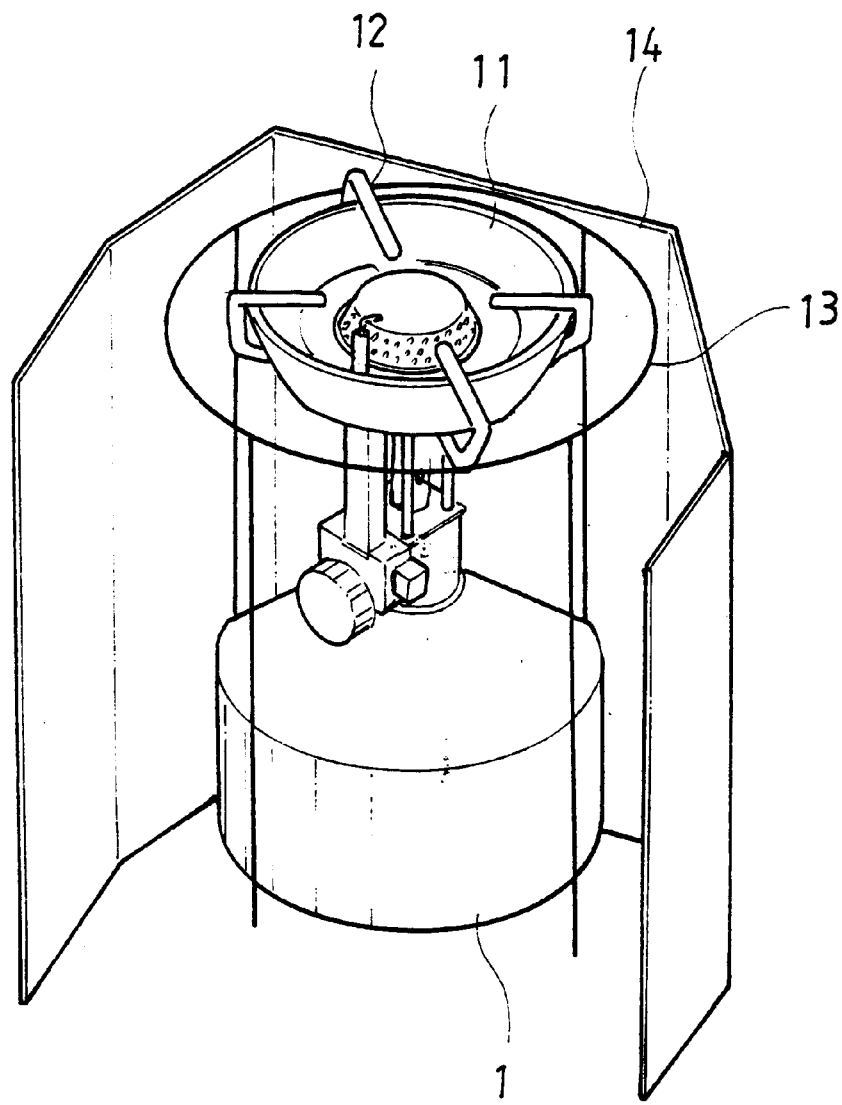
FIG. 1 is a perspective showing conventional miniature gas stove supporting frame and wind shielding screen.
Figure 2:
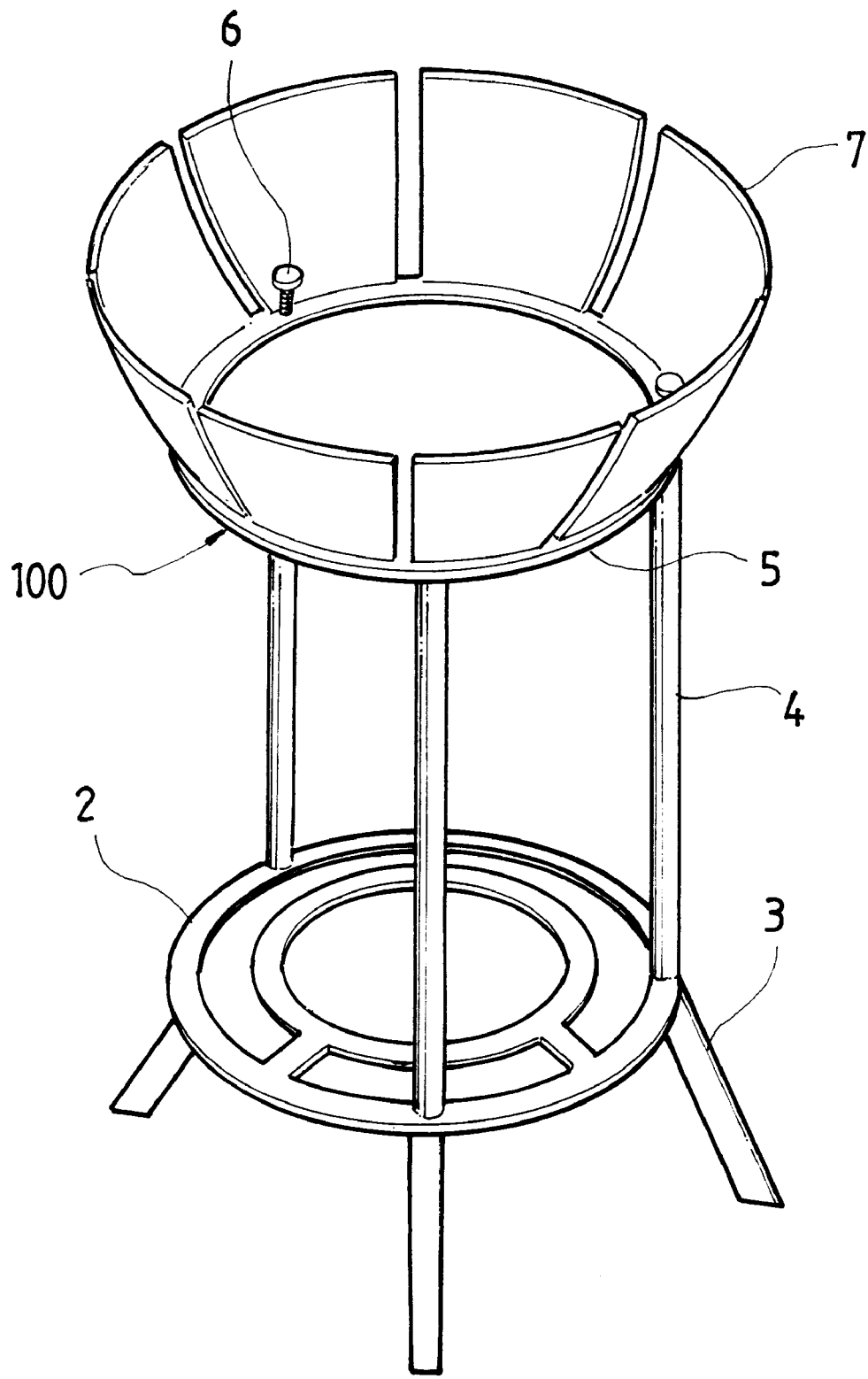
FIG. 2 is an assembled perspective of a miniature gas stove support according to the present invention.
Figure 3:
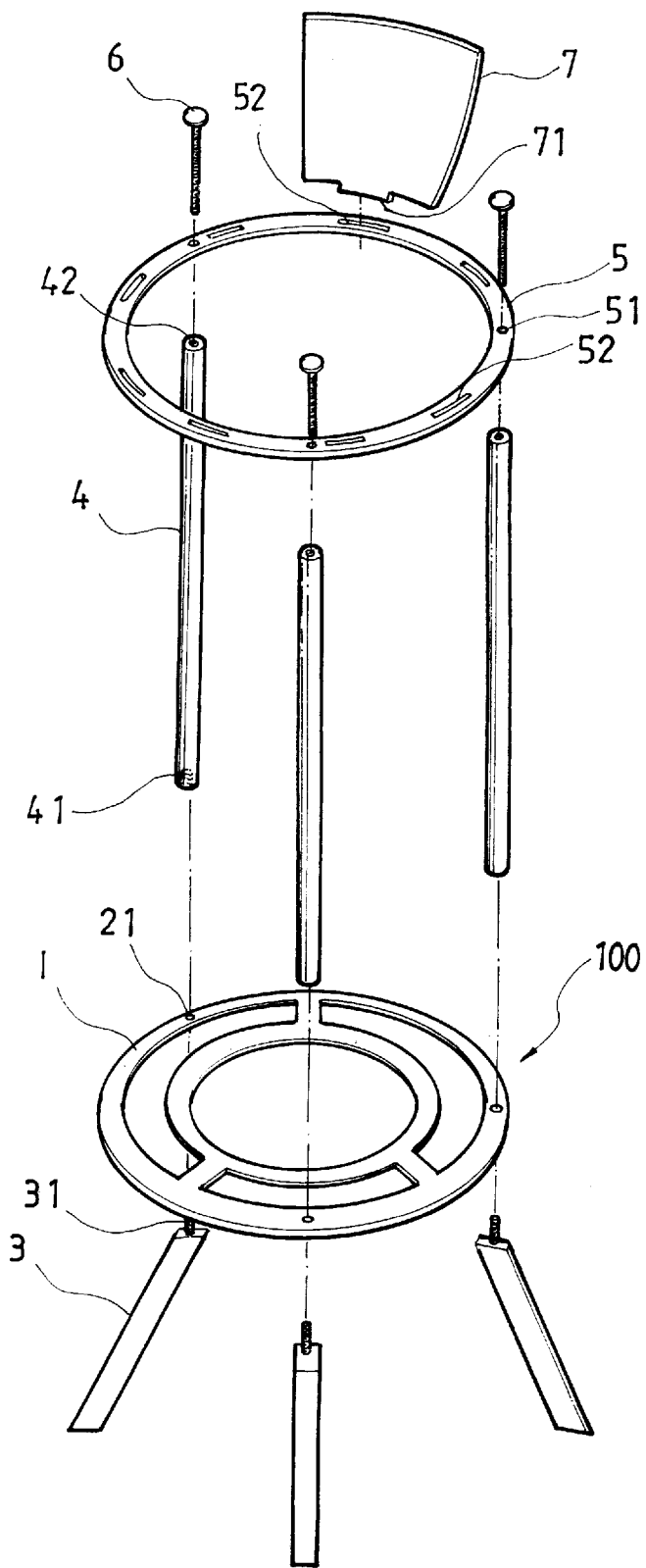
FIG. 3 is an exploded perspective of the miniature gas stove support of FIG. 2.

Please refer to FIGS. 2 and 3 at the same time. The present invention relates to a miniature gas stove support 100 that mainly includes a seat 2, a plurality of legs 3 (three are provided in the illustrated embodiment), vertical bars 4 in the same number as that of the legs 3, a locating ring 5, and a plurality of substantially petal-shaped wind shielding members 7.

The seat 2 is formed from an outer ring and an inner ring that are concentric with and connected to each other. And there are spaced through holes 21 provided on the outer ring of the seat 2.

The legs 3 are located below the seat 2 in an outward inclined position with an externally threaded head portion 31 at their upper end upward extended through and projected from the through holes 21 on the seat 2.

The vertical bars 4 have internally threaded upper and lower ends 41 and 42, respectively. The internally threaded lower ends 41 of the vertical bars 4 are engaged with the externally threaded head portions 31 of the legs 3 upward projected from the through holes 21 of the seat 2, so that the legs 3 are fixedly connected to the seat 2 to support the same.

The locating ring 5 is provided with spaced through holes 51 corresponding to the through holes 21 on the seat 2. Bolts 6 are downward screwed from a top of the locating ring 5 to separately extend through the through holes 51 so as to engage with the internally threaded upper ends 42 of the vertical bars 4 that have lower ends connected to the seat 2 and the legs 3. Whereby, the locating ring 5 and the seat 2 are distantly connected through the vertical bars 4. The locating ring 5 is also provided with a plurality of spaced arcuate openings 52. The arcuate openings 52 are in the same numbers as that of the petal-shaped wind shielding members 7, so that each arcuate opening 52 receives a wind shield member 7 therein.

The petal-shaped wind shielding member 7 each is a curved and gradually downward narrowed plate. A lower edge of each wind shielding member 7 is provided with a downward projected insertion portion 71 that has a width narrower than the lower edge of the wind shielding member 7 and can be fitly inserted into one arcuate opening 52 on the locating ring 5 and be retained thereto. After all the petal-shaped wind shielding members 7 have been connected to the locating ring 5 by inserting the lower insertion portions 71 into the arcuate openings 52, they together form a bowl-like wind shielding wall.

Figure 4:
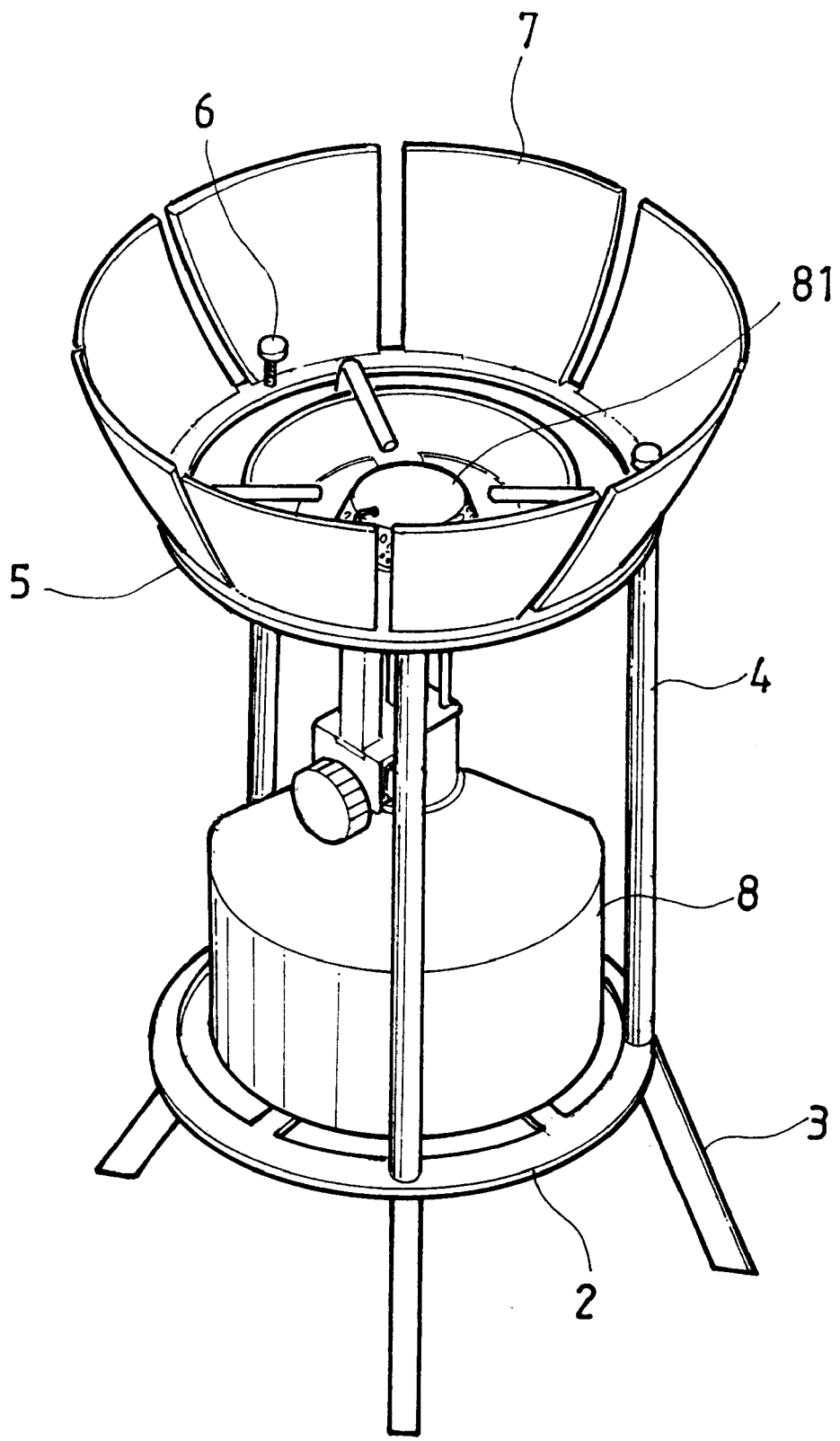
FIG. 4 shows the miniature gas stove support of the present invention with a miniature gas stove disposed therein.

Please now refer to FIG. 4. When a miniature gas stove 8 is to be used outdoors, a user may easily assemble the seat 2, the legs 3, the vertical bars 4, the locating ring 5, and the wind shielding members 7 to form a complete miniature gas stove support 100 according to the present invention. Then, the miniature gas stove 8 may be disposed in the stove support 100 via the locating ring 5 with a bottom of the miniature gas stove 8 flatly located on and contacting with the inner ring of the seat 2. A cooking utensil (not shown) is then positioned immediately above a burner 81 of the miniature gas stove 8 and is supported by the bolts 6. By turning the bolts 6 in different directions to raise or lower the bolts 6, the cooking utensil could be stably positioned on the bolts 6, and an optimal distance between the burner 81 and the cooking utensil could be achieved to allow most effective heat energy utilization and highest cooking efficiency.

The bowl-like wind shielding wall formed by arranging the petal-shaped members 7 along the locating ring 5 effectively stops wind from directly blowing against the burner 81 and the cooking utensil above it, and therefore advantageously protects the ignited burner 81 from easily extinguished. Moreover, the curved surfaces of the petal-shaped wind shielding members reflect heat radiated on them to enhance a heating efficiency of the miniature gas stove 8.

What is claimed is:

1. A miniature gas stove support comprising a seat, a plurality of legs, a plurality of vertical bars in the same number as that of said legs, a locating ring, and aplurality of substantially petal-shaped wind shielding members;

said seat being formed from an outer ring and an inner ring that are concentric with and connected to each other, and spaced through holes being provided on said outer ring of said seat;

said legs being located below said seat in an outward inclined position with an externally threaded head portion at their upper end upward extended through and projected from said through holes on said seat;

said vertical bars having internally threaded upper and lower ends, said internally threaded lower ends of said vertical bars being engaged with said externally threaded head portions of said legs upward projected from said through holes of said seat, so that said legs are fixedly connected to said seat to support the same;

said locating ring being provided with spaced through holes corresponding to said through holes on said seat, bolts being downward screwed from a top of said locating ring to separately extend through said through holes so as to engage with said internally threaded upper ends of said vertical bars that have lower ends connected to said seat and said legs, whereby said locating ring and said seat are distantly connected through said vertical bars; said locating ring also being provided with a plurality of spaced arcuate openings in the same numbers as that of said petal-shaped wind shielding members, so that each said arcuate opening receives one said wind shielding member therein; and said petal-shaped wind shielding members being connected to said locating ring by inserting an insertion portion into said arcuate openings on said locating ring to form a bowl-like wall around said locating ring.

2. A miniature gas stove support as claimed in claim 1, wherein each said petal-shaped wind shielding member is a curved and gradually downward narrowed plate that advantageously reflects heat radiated on said petal-shaped wind shielding member and therefore enhances a heating efficiency of a miniature gas stove positioned on said miniature gas stove support, and wherein said insertion portion downward projects from and is narrower than a lower edge of said petal-shaped wind shielding member for fitly inserting into said arcuate opening on said locating ring and being retained thereto.

* * * * *